United States Patent
Kumar et al.

(10) Patent No.: US 11,847,502 B2
(45) Date of Patent: *Dec. 19, 2023

(54) REMOTELY MANAGING EXECUTION OF JOBS IN A CLUSTER COMPUTING FRAMEWORK

(71) Applicant: Capital One Services, LLC, McLean, VA (US)

(72) Inventors: Ashwini Kumar, Vienna, VA (US); Lakshmi Narasimha Sarma Kattamuri, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 327 days.

This patent is subject to a terminal disclaimer.

(21) Appl. No.: 16/717,234

(22) Filed: Dec. 17, 2019

(65) Prior Publication Data

US 2020/0125416 A1 Apr. 23, 2020

Related U.S. Application Data

(63) Continuation of application No. 15/896,911, filed on Feb. 14, 2018, now Pat. No. 10,514,958.

(51) Int. Cl.
*G06F 9/46* (2006.01)
*G06F 9/50* (2006.01)
(Continued)

(52) U.S. Cl.
CPC ............ *G06F 9/5066* (2013.01); *G06F 9/448* (2018.02); *G06F 9/5027* (2013.01);
(Continued)

(58) Field of Classification Search
CPC ...... G06F 9/5066; G06F 9/448; G06F 9/5027; G06F 9/5038; G06F 9/5072; G06F 11/1402
(Continued)

(56) References Cited

U.S. PATENT DOCUMENTS 9,052,942 B1   6/2015   Barber et al.
9,417,917 B1   8/2016   Barber et al.
(Continued)

OTHER PUBLICATIONS

AWS, "AWS Data Pipeline API Reference API Version Oct. 29, 2012," AWS Data Pipeline API Reference, https://docs.aws.amazon.com/datapipeline/latest/APIReference/datapipelineapi.pdf#Welcome, 2018, 96 pages.
(Continued)

*Primary Examiner* — Bradley A Teets
(74) *Attorney, Agent, or Firm* — Harrity & Harrity, LLP

(57) ABSTRACT

A device, that provides serverless computing, receives a request to execute multiple jobs, and determines criteria for each of the plurality of jobs, wherein the criteria for each of the multiple jobs includes at least one of job posting criteria, job validation criteria, job retry criteria, or a disaster recovery criteria. The device stores information associated with the multiple jobs in a repository, wherein the information associated with the multiple jobs includes the criteria for each of the multiple jobs. The device provides a particular job, of the multiple jobs, to a cluster computing framework for execution, determines modified criteria for the particular job, and provides the modified criteria for the particular job to the cluster computing framework. The device receives, from the cluster computing framework, information indicating that execution of the particular job is complete, and validates a success of completion of the execution of the particular job.

20 Claims, 10 Drawing Sheets

(51) Int. Cl.
G06F 11/14 (2006.01)
G06F 9/448 (2018.01)

(52) U.S. Cl.
CPC .......... G06F 9/5038 (2013.01); G06F 9/5072 (2013.01); G06F 11/1402 (2013.01)

(58) Field of Classification Search
USPC .......................................................... 718/100
See application file for complete search history.

(56) References Cited

U.S. PATENT DOCUMENTS

| | | | |
|---|---|---|---|
| 10,514,958 B2* | 12/2019 | Kumar | G06F 9/5072 |
| 2005/0155033 A1 | 7/2005 | Luoffo et al. | |
| 2008/0271042 A1* | 10/2008 | Musuvathi | G06F 11/3688 |
| | | | 718/108 |
| 2010/0250748 A1* | 9/2010 | Sivasubramanian | |
| | | | G06F 11/3442 |
| | | | 709/226 |
| 2011/0138391 A1 | 6/2011 | Cho et al. | |
| 2013/0262556 A1 | 10/2013 | Xu et al. | |
| 2015/0205634 A1 | 7/2015 | McPherson et al. | |
| 2016/0048415 A1 | 2/2016 | Sarma et al. | |
| 2016/0098472 A1 | 4/2016 | Appleton et al. | |
| 2016/0112509 A1* | 4/2016 | Tracht | H04L 12/1863 |
| | | | 709/217 |
| 2016/0162611 A1 | 6/2016 | Mardikar et al. | |
| 2017/0185488 A1 | 6/2017 | Kumarasamy et al. | |
| 2017/0277772 A1 | 9/2017 | Jiang et al. | |
| 2018/0255122 A1* | 9/2018 | Hu | G06F 11/3006 |

OTHER PUBLICATIONS

Chronas, https://mesos.github.io/chronos/, Dec. 9, 2016, 2 pages.
Chronos: Rest API, https://mesos.github.io/chronos/docs/api.html, May 23, 2015, 10 pages.
Datastax, Inc., "Using the Spark Jobserver," https://docs.datastax.com/en/dse/5.1/dse-admin/datastax_enterprise/spark/spark/Jobserveroverview.html, Feb. 8, 2018, 2 pages.
Extended European Search Report for Application No. EP19156662.9, dated Jul. 4, 2019, 9 pages.
Leibert F., et al., "Chronos Readme," https://github.com/mesos/chronos/blob/master/README.md, Feb. 10, 2017, 2 pages.
Ling E., "Chronos 2.3.3 Released," https://mesosphere.com/blog/chronos-2-3-3-released/, Apr. 30, 2015.
Netflix, "Genie," https://netflix.github.io/genie/, Nov. 15, 2016, 5 pages.

* cited by examiner

REMOTELY MANAGING EXECUTION OF JOBS IN A CLUSTER COMPUTING FRAMEWORK

RELATED APPLICATION

This application is a continuation of U.S. patent application Ser. No. 15/896,911, filed Feb. 14, 2018 (now U.S. Pat. No. 10,514,958), the content of which is incorporated herein by reference.

BACKGROUND

An open-source cluster computing framework (e.g., Apache Spark, Amazon Elastic MapReduce (EMR), and/or the like) may provide batch processing and stream processing of jobs. The cluster computing framework provides application programming interfaces (APIs) that allow cluster devices to execute jobs (e.g., machine learning, structured query language (SQL), and/or the like) that require fast and iterative access to datasets. The cluster computing framework may include clusters, and each cluster may include a master device, a driver device, and executor devices. The master device receives jobs from client devices (e.g., via scripts that submit the jobs to the master device), and schedules the jobs for execution. When a job is scheduled to be executed, the master device provides the job to the driver device. The driver device divides the job into multiple tasks, and provides the tasks to the executor devices for execution.

SUMMARY

According to some implementations, a device may include one or more memories, and one or more processors communicatively coupled to the one or more memories. The one or more processors may be configured to receive a request to execute multiple jobs, and determine criteria for each of the multiple jobs, wherein the criteria for each of the multiple jobs includes at least one of job posting criteria, job validation criteria, or job retry criteria. The one or more processors may be configured to store information associated with the multiple jobs in a repository, wherein the information associated with the multiple jobs includes the criteria for each of the multiple jobs. The one or more processors may be configured to provide a particular job, of the multiple jobs, to a cluster computing framework for execution, determine modified criteria for the particular job, and provide the modified criteria for the particular job to the cluster computing framework. The one or more processors may be configured to receive, from the cluster computing framework, information indicating that execution of the particular job is complete, and validate a success of completion of the execution of the particular job.

According to some implementations, a method may include receiving, by a device and from a client device, a request to execute multiple jobs, and determining, by the device, criteria for each of the multiple jobs, wherein the criteria for each of the multiple jobs includes at least one of job posting criteria, job validation criteria, or job retry criteria. The method may include storing information associated with the multiple jobs in a repository, wherein the information associated with the multiple jobs includes the criteria for each of the multiple jobs. The method may include posting, by the device, a particular job, of the multiple jobs, to a cluster computing framework for execution, and receiving, by the device and from the cluster computing framework, information indicating that execution of the particular job failed. The method may include performing, by the device, a disaster recovery technique for the particular job based on the information indicating that the execution of the particular job failed, and reposting, by the device, the particular job to the cluster computing framework based on the disaster recovery technique. The method may include receiving, by the device and from the cluster computing framework, information indicating that execution of the particular job is complete, and validating, by the device, a success of completion of the execution of the particular job.

According to some implementations, a non-transitory computer-readable medium may store instructions. The instructions may include one or more instructions that, when executed by one or more processors of a device, cause the one or more processors to receive a request to execute multiple jobs, and determine criteria for each of the multiple jobs, wherein the criteria for each of the multiple jobs including at least one of job execution criteria, job posting criteria, job validation criteria, or job retry criteria. The one or more instructions may cause the one or more processors to store information associated with the multiple jobs in a repository, wherein the information associated with the multiple jobs includes information associated with a cluster computing framework, information indicating names of the multiple jobs, and the criteria for each of the multiple jobs. The one or more instructions may cause the one or more processors to provide a particular job, of the multiple jobs, to the cluster computing framework for execution, and receive, from the cluster computing framework, result information indicating that execution of the particular job is complete or failed. The one or more instructions may cause the one or more processors to selectively perform an action based on the result information. When the result information indicates that the execution of the particular job is complete, the action may be to validate a success of completion of the execution of the particular job. When the result information indicates that the execution of the particular job failed, the action may be to perform a disaster recovery technique for the particular job, and provide the particular job to the cluster computing framework after performing the disaster recovery technique.

DETAILED DESCRIPTION

The following detailed description of example implementations refers to the accompanying drawings. The same reference numbers in different drawings may identify the same or similar elements.

The master device of the cluster computing framework manages a job by scheduling the job for provision to the driver device and execution by the executor devices. However, the master device needs to be constantly operational in order to manage jobs (e.g., even when no jobs need to be executed), which increases costs and wastes computing resources (e.g., processors, memory, and/or the like). Furthermore, the master device cannot manage a group of interdependent jobs, cannot retry failed jobs, cannot provide disaster recovery during cluster failure, and cannot log job status.

Some implementations described herein may provide a job manager platform that remotely (e.g., remotely from a master device of a cluster computing framework) manages execution of jobs in the cluster computing framework. For example, the job manager platform may receive a request to execute jobs, and may determine criteria for each of the jobs. The job manager platform may store information associated with the jobs in a repository, and may provide a job, of the jobs, to a cluster computing framework for execution. The job manager platform may determine modified criteria for the job, and may provide the modified criteria to the cluster computing framework. The job manager platform may receive, from the cluster computing framework, information indicating that execution of the job is completed, and may validate a success of completion of the execution of the job.

Figure 1A:
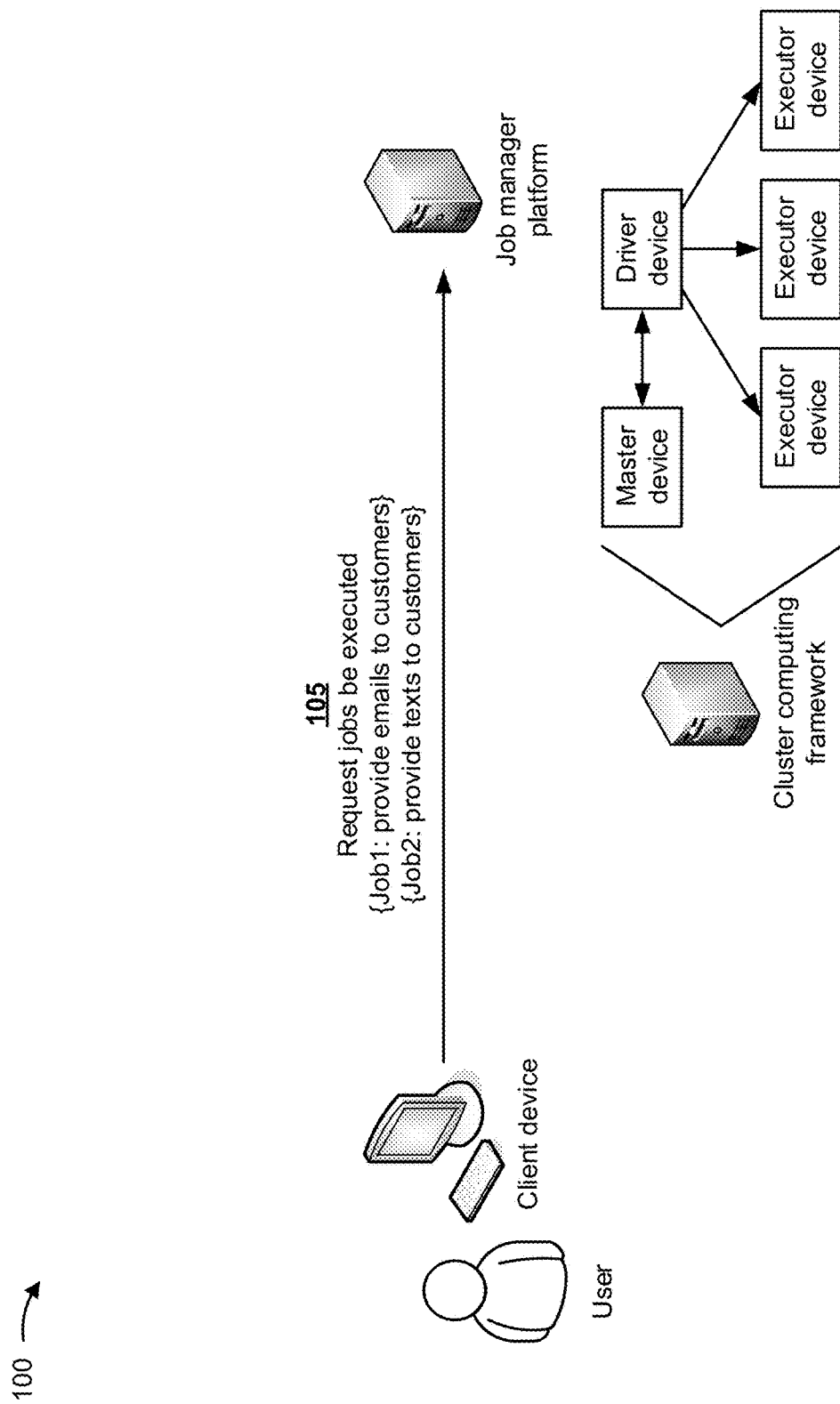
FIGS. 1A-1G are diagrams of an overview of an example implementation described herein.

FIGS. 1A-1G are diagrams of an overview of an example implementation 100 described herein. As shown in FIG. 1A, a user may be associated with a client device, a job manager platform, and a cluster computing framework. Assume that the user wishes to have jobs executed by the cluster computing framework. For example, assume that the user wishes to have a first job (e.g., Job1 that includes providing emails to customers) and a second job (e.g., Job2 that includes providing texts to customers) executed by the cluster computing framework. As further shown in FIG. 1A, and by reference number 105, the user may cause the client device to provide, to the job manager platform, a request to have the jobs (e.g., Job1 and Job2) executed by the cluster computing framework. The job manager platform may receive the request and information associated with the jobs. In some implementations, the information associated with the jobs may include identifiers of the jobs, information identifying clusters to execute the jobs, information indicating whether the jobs are to be deleted upon completion, information indicating whether execution of the jobs are to be protected by a disaster recovery technique, and/or the like.

As further shown in FIG. 1A, the cluster computing framework may include a cluster that includes a master device, a driver device, and executor devices. The master device may receive jobs from the job manager platform (e.g., jobs received from the client device), and may schedule the jobs for execution. When a job, of the jobs, is scheduled to be executed, the master device may provide the job to the driver device. The driver device may divide the job into multiple tasks, and may provide the tasks to the executor devices for execution. The executor devices may execute the tasks to generate results, and may provide the results to the driver device. The driver device may provide the results to the master device, and the master device may provide the results to the job manager platform.

Figure 1B:
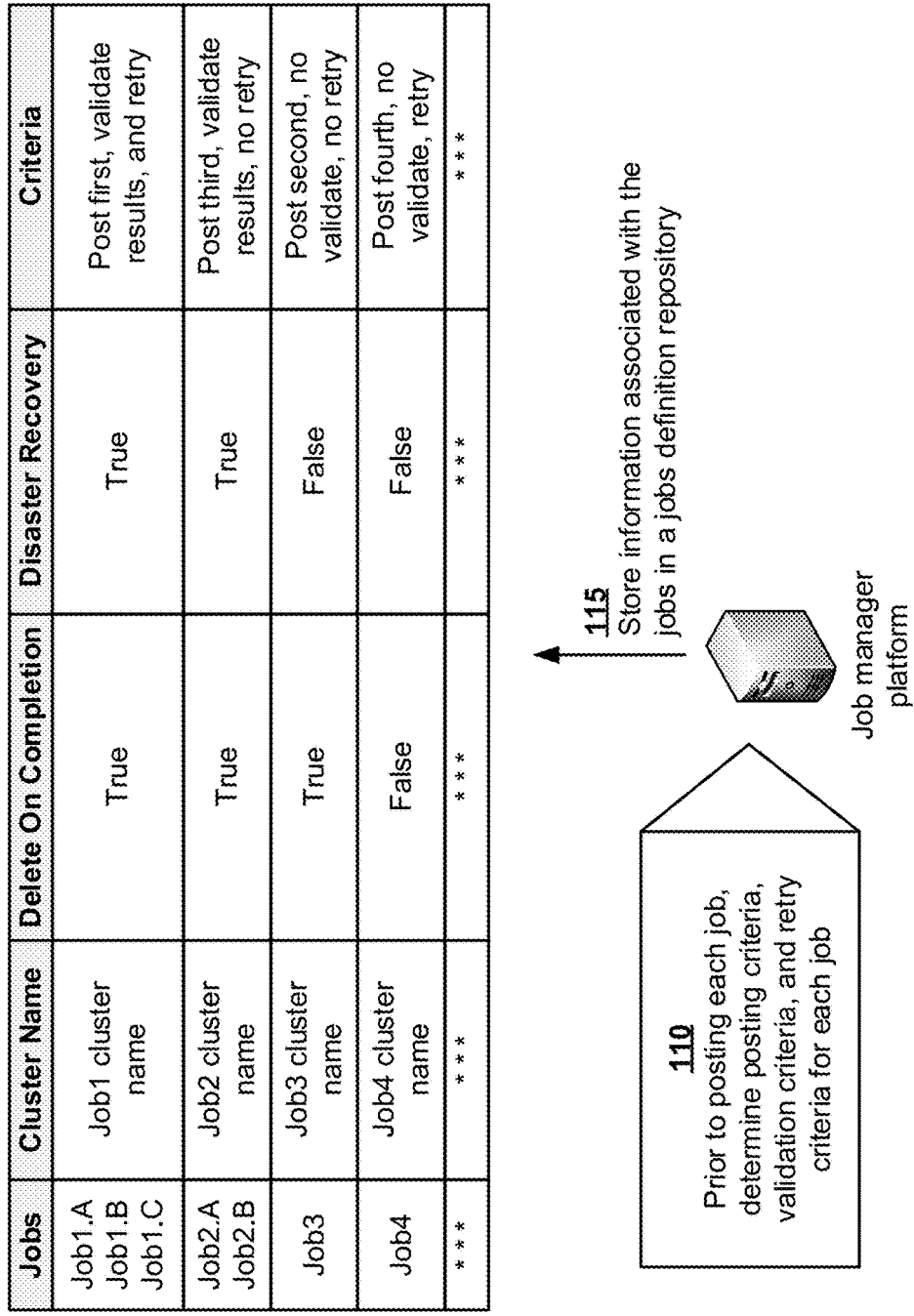

As shown in FIG. 1B, and by reference number 110, prior to posting each job to the cluster computing framework, the job manager platform may determine execution criteria for each job, posting criteria for each job, validation criteria for each job, retry criteria for each job, and/or the like. In some implementations, the execution criteria may include criteria indicating how the jobs are to execute on the cluster computing framework (e.g., sequentially, in parallel, at particular times, and/or the like). In some implementations, the posting criteria may include criteria indicating when the jobs are to be posted to (e.g., provided to) the cluster computing framework (e.g., posted first, second, third, and/or the like). In some implementations, the validation criteria may include criteria indicating whether results of executing the jobs are to be validated (e.g., checked for accuracy, checked for completion, and/or the like). In some implementations, the retry criteria may include criteria indicating whether jobs are to be resubmitted for execution by the cluster computing framework when the cluster computing framework fails to execute jobs.

As further shown in FIG. 1B, and by reference number 115, the job manager platform may store the information associated with the jobs and the criteria in a repository (e.g., that includes a data structure, such as a database, a table, a linked list, and/or the like) associated with the job manager platform. In some implementations, the data structure may include a jobs field (e.g., Job1.A, Job1.B, Job1.C, Job2.A, Job2.B, Job3, etc.) for storing job identifiers of jobs and portions of jobs (e.g., A, B, C, etc.), a cluster names field (e.g., Job1 cluster name, Job2 cluster name, etc.) for storing cluster names associated with clusters for executing the jobs, a delete on completion field for storing information indicating whether the jobs are to be deleted upon completion, a disaster recovery field for storing information indicating whether jobs are subject to a disaster recovery technique, a criteria field for storing the criteria for the jobs (and portions of jobs), and/or the like, associated with the information associated with the jobs and the criteria. In some implementations, the job manager platform may securely store the information associated with the jobs and the criteria, as described elsewhere herein.

Figure 1C:
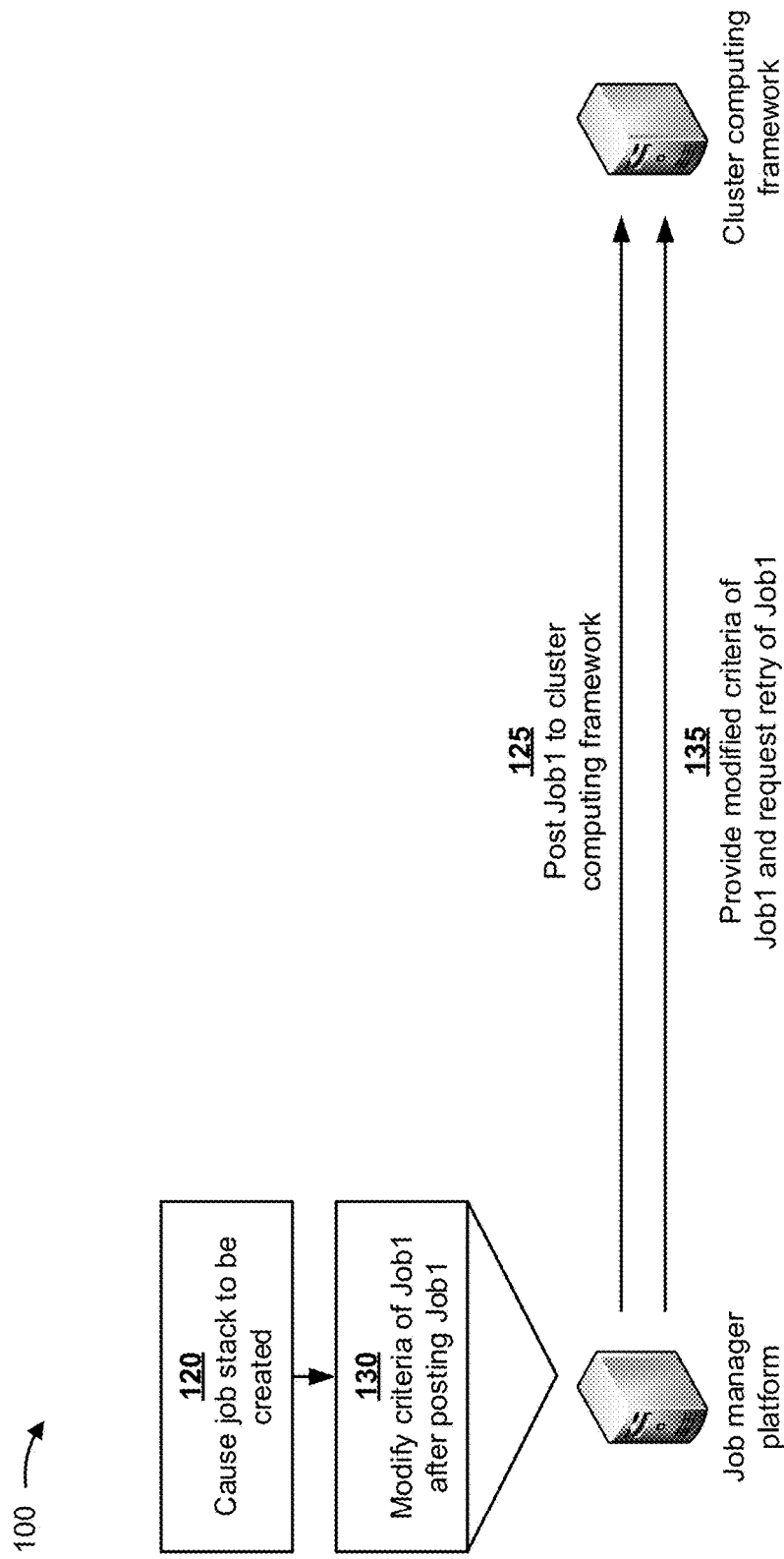

As shown in FIG. 1C, and by reference number 120, the job manager platform may cause a job stack to be created based on the jobs. In some implementations, the job stack may be securely stored in the repository, associated with the job manager platform, in the manner described herein for the information associated with the jobs and the criteria. In some implementations, the job stack may include a list of the jobs provided in an order that the jobs are to be executed. The job manager platform may determine the order of the jobs in the job stack based on the criteria (e.g., the execution criteria, the posting criteria, and/or the like) for the jobs.

As further shown in FIG. 1C, and by reference number 125, once the job stack is created, the job manager platform may post a first job (e.g., Job1) from the job stack to the cluster computing framework. In some implementations, when posting the first job to the cluster computing framework, the job manager platform may provide, to the cluster computing framework, information associated with the first job, criteria for the first job, and a request to execute the first job in accordance with the information associated with the first job and the criteria for the first job. In some implementations, the cluster computing framework may receive the information associated with the first job, the criteria for the first job, and the request to execute the first job, and may begin executing the first job.

As further shown in FIG. 1C, and by reference number 130, assume that the job manager platform modifies a criteria for the first job after posting the first job to the cluster computing framework. For example, assume that the job manager platform modifies the criteria of the first job to indicate that execution of the first job is to include additional parameters (e.g., sending the emails on the same day). Based on modifying the criteria for the first job, and as shown by reference number 135 in FIG. 1C, the job manager platform may provide, to the cluster computing framework, the modified criteria and a request to retry execution of the first job. In some implementations, the cluster computing framework may receive the modified criteria and the request to retry the execution of the first job, and may cease execution of the first job. In such implementations, the cluster computing framework may then retry executing the first job based on the modified criteria.

Figure 1D:
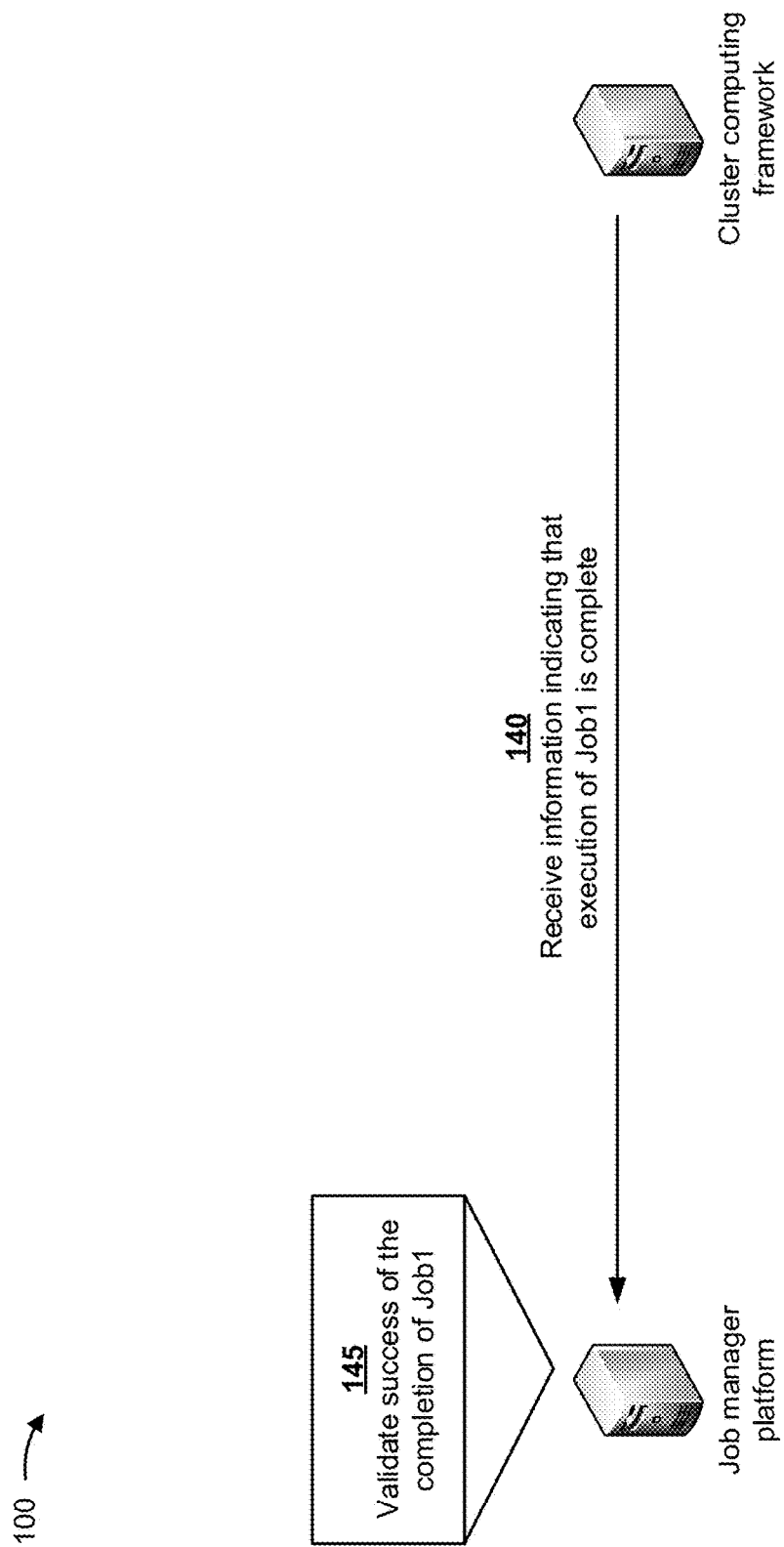

As shown in FIG. 1D, and by reference number 140, the job manager platform may receive, from the cluster computing framework, information indicating that execution of the first job is complete. In some implementations, the information indicating that execution of the first job is complete may include a notification that execution of the first job is complete, information indicating results of executing the first job, information indicating errors encountered during execution of the first job, and/or the like.

As further shown in FIG. 1D, and by reference number 145, when the job manager platform receives the information indicating that execution of the first job is complete, the job manager platform may validate a success of the completion of the first job. In some implementations, the job manager platform may validate the success of the completion of the first job by analyzing the results of executing the first job, and determining whether the results are correct. For example, the job manager platform may determine whether all of the emails were sent to the correct customers on the same day, as requested by the first job. In some implementations, the job manager platform may perform analytics on the results of executing the first job, as described elsewhere herein.

Figure 1E:
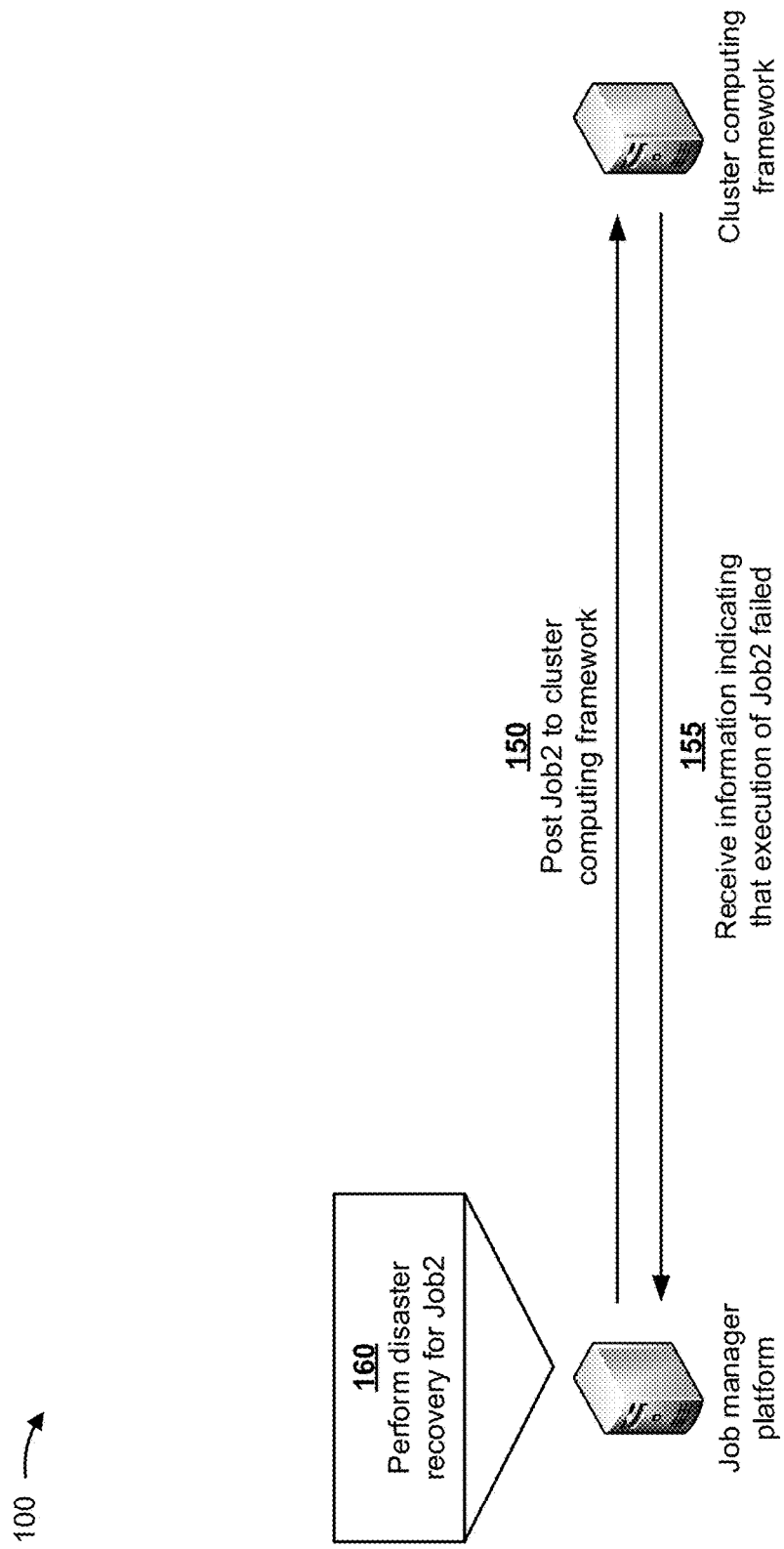

As shown in FIG. 1E, and by reference number 150, the job manager platform may post a second job (e.g., Job2) from the job stack to the cluster computing framework. In some implementations, when posting the second job to the cluster computing framework, the job manager platform may provide, to the cluster computing framework, information associated with the second job, criteria for the second job, and a request to execute the second job in accordance with the information associated with the second job and the criteria for the second job. In some implementations, the cluster computing framework may receive the information associated with the second job, the criteria for the second job, and the request to execute the second job, and may begin executing the second job.

Now assume that during execution of the second job, the cluster executing the second job becomes inoperable (e.g., non-operational). In such a situation, and as shown by reference number 155 in FIG. 1E, the cluster computing framework may provide, to the job manager platform, information indicating that execution of the second job failed (e.g., due to the cluster becoming inoperable). As further shown in FIG. 1E, and by reference number 160, the job manager platform may receive the information indicating that the execution of the second job failed, and may perform a disaster recovery technique. In some implementations, the disaster recovery technique may include the job manager platform instructing the cluster computing framework to re-route the second job to a different functional cluster associated with the cluster computing framework so that the different cluster may execute the second job. In some implementations, the disaster recovery technique may include the job manager platform instructing a different cluster computing framework to execute the second job.

Figure 1F:
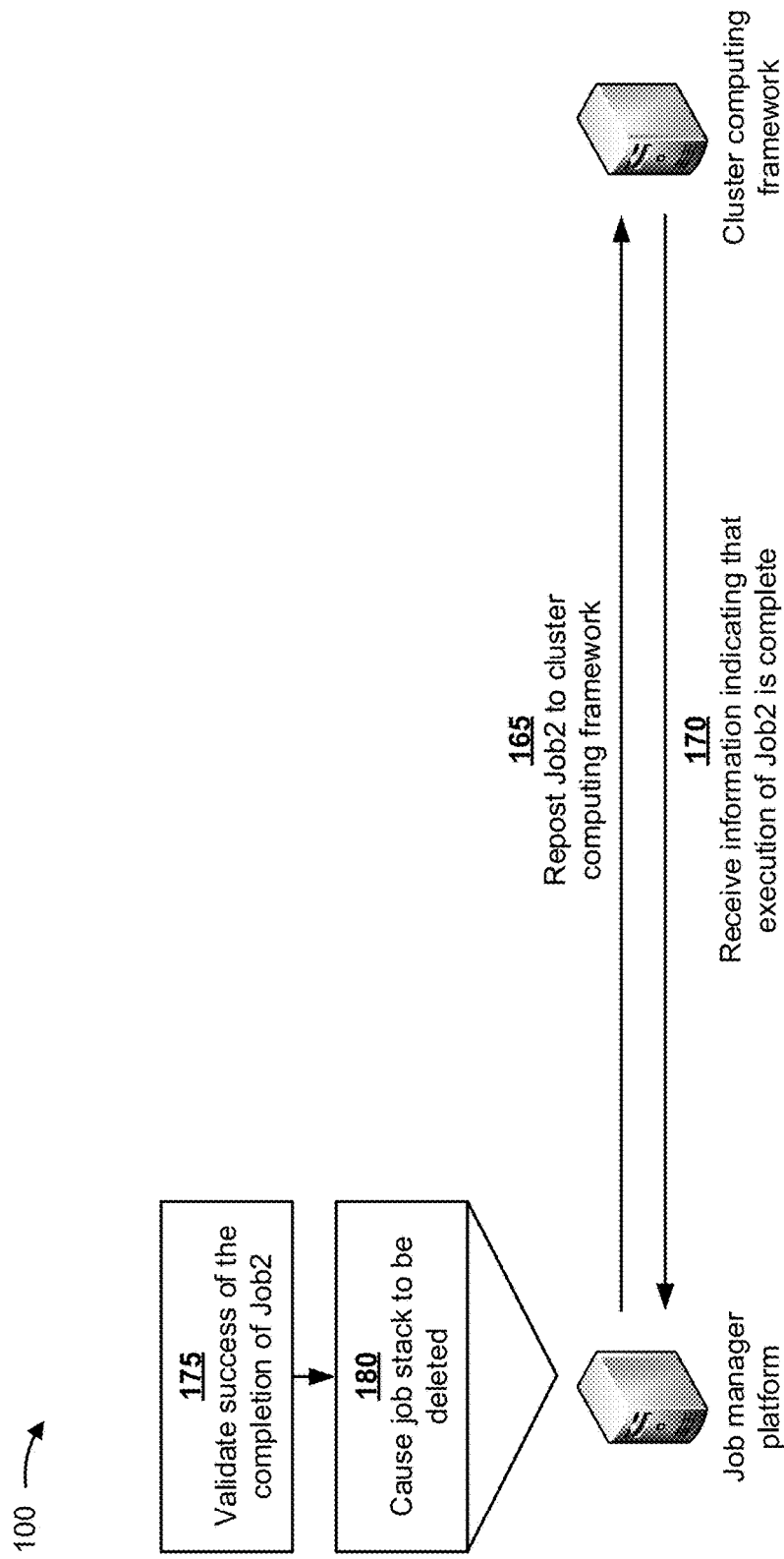

As shown in FIG. 1F, and by reference number 165, in accordance with the disaster recovery technique, the job manager platform may repost the second job to the cluster computing framework. In some implementations, when reposting the second job to the cluster computing framework, the job manager platform may provide, to the cluster computing framework, information associated with the second job, criteria for the second job, and a request to execute the second job on a different functional cluster and in accordance with the information associated with the second job and the criteria for the second job. In some implementations, the cluster computing framework may receive the information associated with the second job, the criteria for the second job, and the request to execute the second job, and may begin executing the second job with the different functional cluster.

As further shown in FIG. 1F, and by reference number 170, the job manager platform may receive, from the cluster computing framework, information indicating that execution of the second job is complete. In some implementations, the information indicating that execution of the second job is complete may include a notification that execution of the second job is complete, information indicating results of executing the second job, information indicating errors encountered during execution of the second job, and/or the like.

As further shown in FIG. 1F, and by reference number 175, when the job manager platform receives the information indicating that execution of the second job is complete, the job manager platform may validate a success of the completion of the second job. In some implementations, the job manager platform may validate the success of the completion of the second job by analyzing the results of executing the second job, and determining whether the results are correct. For example, the job manager platform may determine whether all of the texts were sent to the correct customers, as requested by the second job. In some implementations, the job manager platform may perform analytics on the results of executing the second job, as described elsewhere herein.

As further shown in FIG. 1F, and by reference number 180, after the job manager platform validates the success of the completion of the second job, the job manager platform may cause the job stack to be deleted. In some implementations, the job manager platform may cause the job stack to be deleted after all of the jobs have been successfully executed. In some implementations, the job manager platform may cause the job stack to be deleted after a particular period of time. In some implementations, the job manager platform may not delete the job stack if the jobs in the job stack are recurring jobs, may delete only non-recurring jobs from the job stack, and/or the like.

Figure 1G:
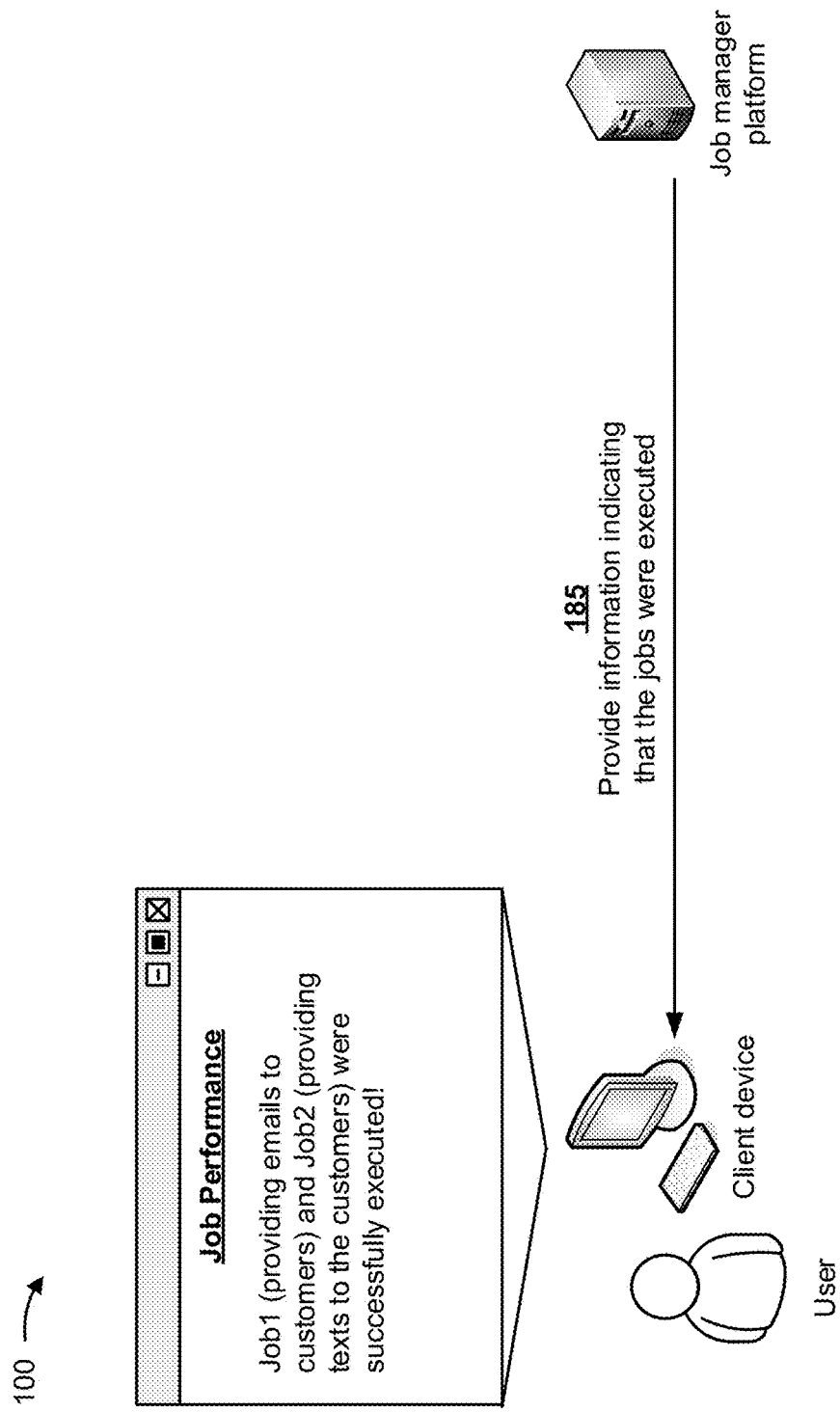

As shown in FIG. 1G, and by reference number 185, the job manager platform may provide, to the client device, information indicating that the jobs (e.g., Job1 and Job2) were executed. The client device may receive the information indicating that the jobs were executed, and may provide the information indicating that the jobs were executed, for display to the user, via a user interface. For example, the user interface may include information indicating that the first job (e.g., providing emails to the customers) and the second job (e.g., providing texts to the customers) were successfully executed.

In this way, the job manager platform may remotely manage execution of jobs in a cluster computing framework, which may improve speed and efficiency associated with executing the jobs in the cluster computing framework, and may conserve computing resources (e.g., processors, memory, and/or the like) associated with the cluster computing framework. Furthermore, implementations described herein use a computerized process to perform tasks or roles that were not previously performed or were previously performed using subjective human intuition or input. For example, prior solutions cannot manage a group of interdependent jobs, cannot retry failed jobs, cannot provide disaster recovery during cluster failure, cannot log job status, and/or the like. Finally, remotely managing execution of jobs in a cluster computing framework conserves computing resources (e.g., processors, memory, and/or the like) that would otherwise be wasted in unsuccessfully attempting to manage the execution of jobs in a cluster computing framework.

Furthermore, the job manager platform provides a mechanism (e.g., serverless computing) that allows a user (e.g., of the client device) to create and execute applications, and does not require the user to provision, scale, and/or manage any server devices, and that enables jobs to be automatically scaled. The job manager platform provides built-in availability and fault tolerance by default, and does not require the user to pay for idle capacity since there is no need to pre-provision or over-provision capacity for processing and/or storage. Finally, the job manager platform manages a group of interdependent jobs, retries failed jobs, provides disaster recovery during cluster failure, logs job status, and/or the like.

As indicated above, FIGS. 1A-1G are provided merely as examples. Other examples are possible and may differ from what was described with regard to FIGS. 1A-1G.

Figure 2:
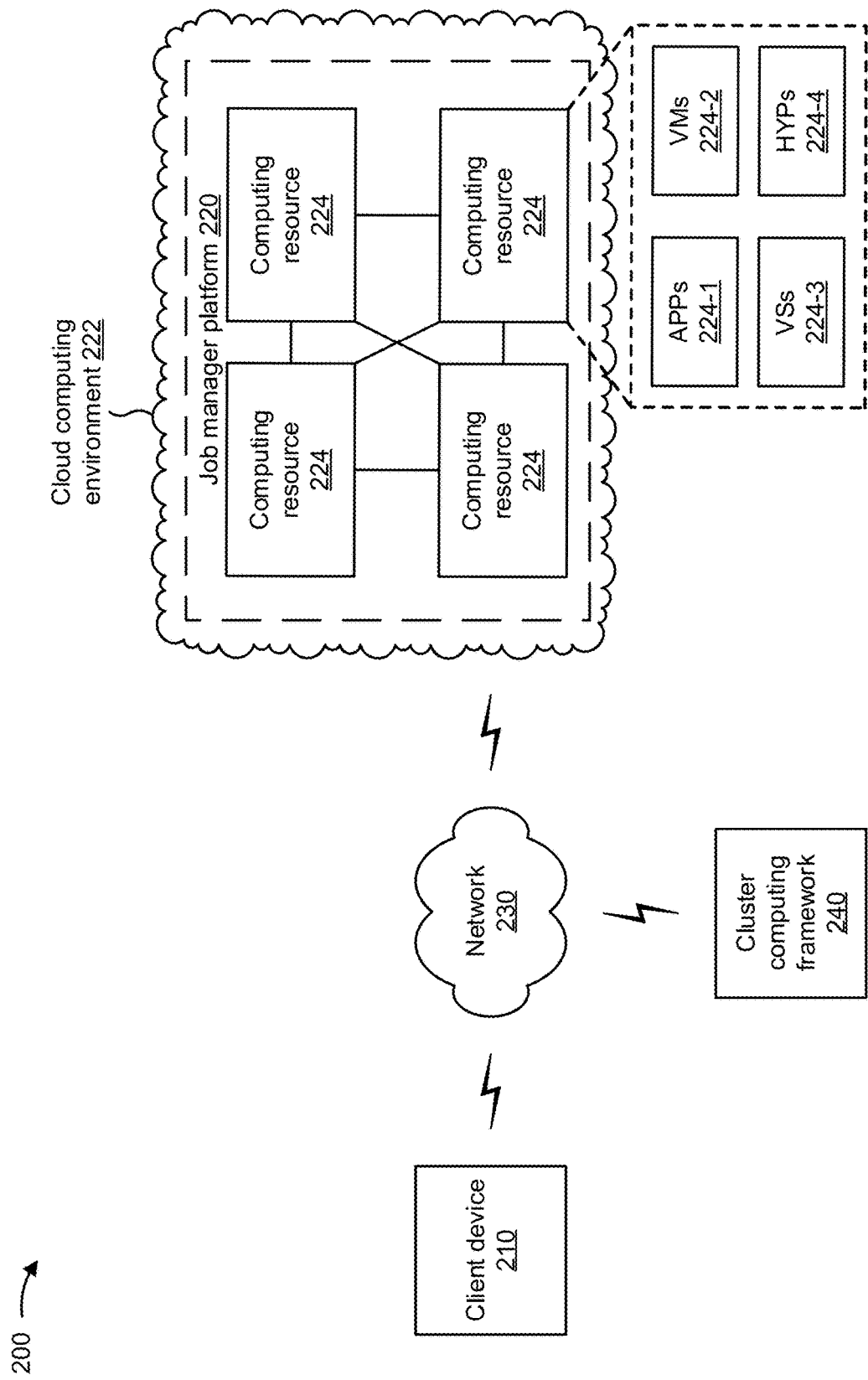
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a job manager platform 220, a network 230, and a cluster computing framework 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), a device that provides a trigger for a trigger-based infrastructure (e.g., job manager platform 220), or a similar type of device. In some implementations, client device 210 may receive information from and/or transmit information to job manager platform 220 and/or cluster computing framework 240.

Job manager platform 220 includes one or more devices that remotely manages execution of jobs in cluster computing framework 240. In some implementations, job manager platform 220 may be designed to be modular such that certain software components may be swapped in or out depending on a particular need. As such, job manager platform 220 may be easily and/or quickly reconfigured for different uses. In some implementations, job manager platform 220 may receive information from and/or transmit information to one or more client devices 210 and/or to cluster computing framework 240.

In some implementations, as shown, job manager platform 220 may be hosted in a cloud computing environment 222. Notably, while implementations described herein describe job manager platform 220 as being hosted in cloud computing environment 222, in some implementations, job manager platform 220 may not be cloud-based (i.e., may be implemented outside of a cloud computing environment) or may be partially cloud-based.

Cloud computing environment 222 includes an environment that hosts job manager platform 220. Cloud computing environment 222 may provide computation, software, data access, storage, etc. services that do not require end-user knowledge of a physical location and configuration of system(s) and/or device(s) that hosts job manager platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host job manager platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with job manager platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210, an operator of job manager platform 220, or an operator of cluster computing environment 240), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Cluster computing environment 240 includes one or more devices capable of receiving, generating, storing, processing, and/or providing information, such as information described herein. For example, cluster computing framework 240 may include clusters, and each cluster may include a master device, a driver device, and executor devices. The master device may receive jobs from job manager platform 220 (e.g., jobs received from client device 210), and may schedule the jobs for execution. When a job, of the jobs, is scheduled to be executed, the master device may provide the job to the driver device. The driver device may divide the job into multiple tasks, and may provide the tasks to the executor devices for execution. The executor devices may execute the tasks to generate results, and may provide the results to the driver device. The driver device may provide the results to the master device, and the master device may provide the results to job manager platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
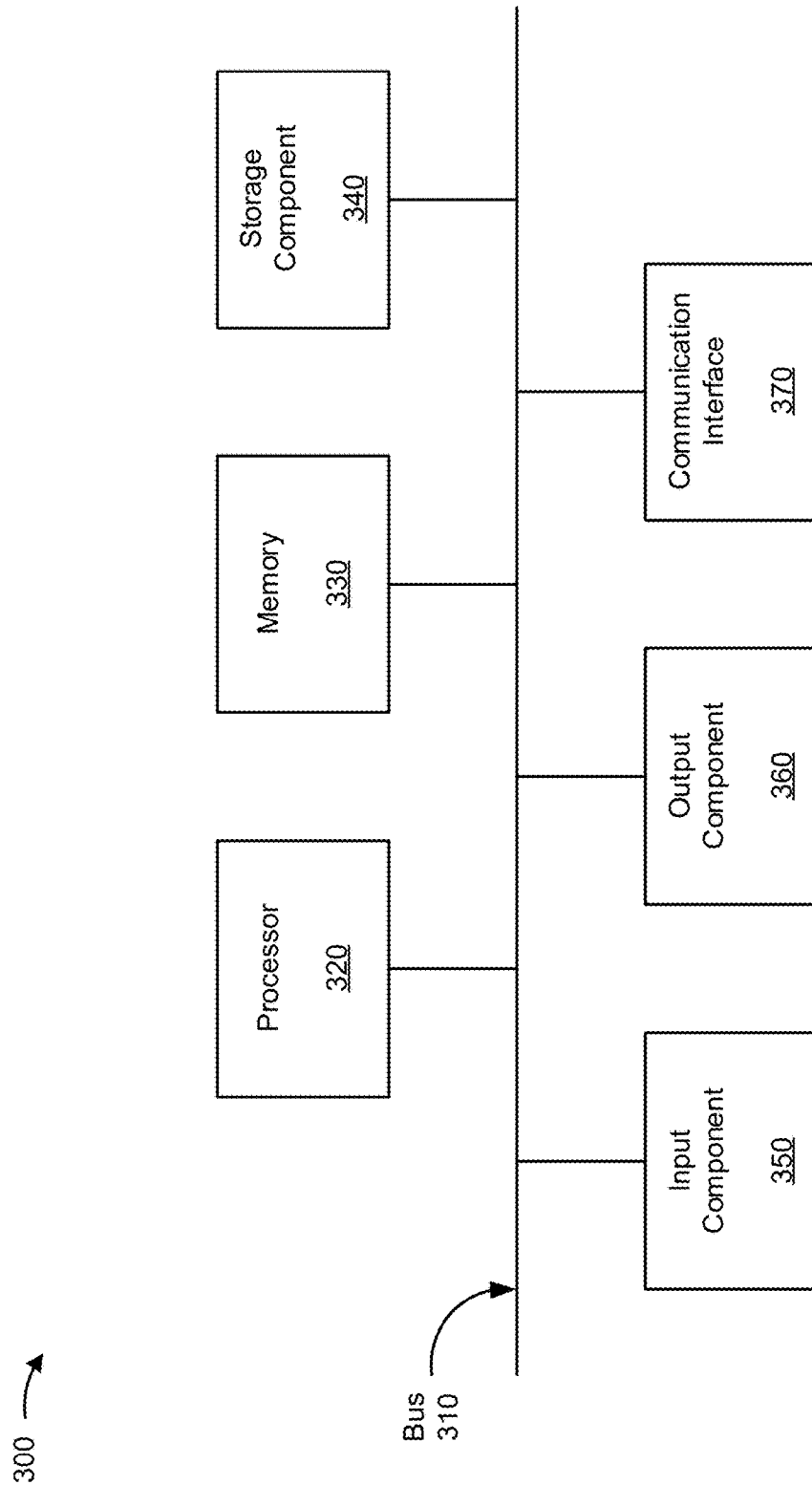
FIG. 3 is a diagram of example components of one or more devices of FIG. 2.

FIG. 3 is a diagram of example components of a device 300. Device 300 may correspond to client device 210, job manager platform 220, computing resource 224, and/or cluster computing framework 240 (e.g., the master device, the driver device, and the executor device). In some implementations, client device 210, job manager platform 220, computing resource 224, and/or cluster computing framework 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
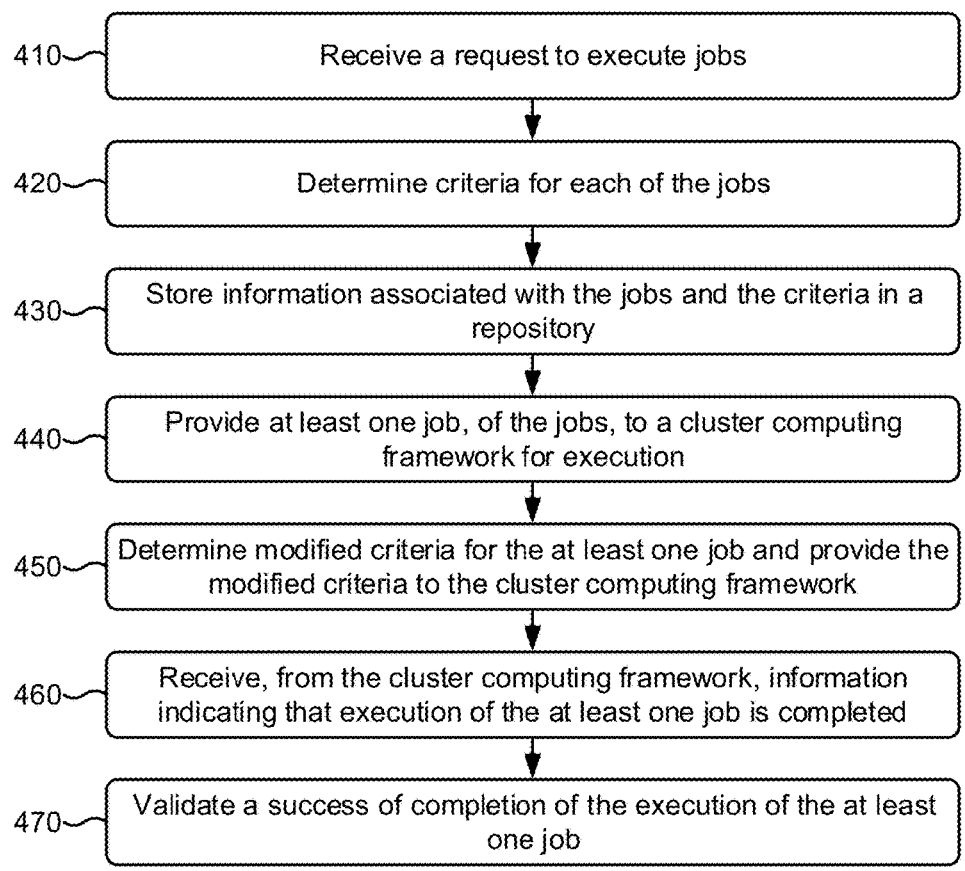
FIG. 4 is a flow chart of an example process for remotely managing execution of jobs in a cluster computing framework.

FIG. 4 is a flow chart of an example process 400 for remotely managing execution of jobs in a cluster computing framework. In some implementations, one or more process blocks of FIG. 4 may be performed by job manager platform 220. In some implementations, one or more process blocks of FIG. 4 may be performed by another device or a group of devices separate from or including job manager platform 220, such as client device 210 and/or cluster computing framework 240.

As shown in FIG. 4, process 400 may include receiving a request to execute jobs (block 410). For example, job manager platform 220 (e.g., using computing resource 224, processor 320, communication interface 370, and/or the like) may receive a request to execute jobs. In some implementations, a user may cause client device 210 to provide, to job manager platform 220, a request to have the jobs executed by cluster computing framework 240. In some implementations, each job may include a job that is efficiently executed by cluster computing framework, such as, for example, automatically generating and sending emails to a large number of customers of a company, executing a machine learning model, performing a SQL query on a database with thousands, millions, billions, and/or the like, of records, and/or the like.

In some implementations, job manager platform 220 may receive the request and information associated with the jobs. In some implementations, the information associated with the jobs may include identifiers of the jobs (e.g., job numbers, job names, and/or the like), information identifying clusters to execute the jobs (e.g., cluster identifiers, cluster names, and/or the like), information indicating whether the jobs are to be deleted upon completion (e.g., if a job is to be executed periodically, the job may not be deleted upon completion, whereas if the job requires a single execution, the job may be deleted upon completion), information indicating whether execution of the jobs are to be protected by a disaster recovery technique (e.g., switching a job to a different cluster when a cluster becomes inoperable, as described elsewhere herein), and/or the like.

In some implementations, job manager platform 220 may receive requests to execute jobs from devices other than client device 210. For example, other devices may automatically generate jobs (e.g., determine a forecasted stock price for an entity) when a trigger event occurs (e.g., when a market indicator changes), and may automatically provide the jobs to job manager platform 220.

In this way, job manager platform 220 may receive the request to execute the jobs.

As further shown in FIG. 4, process 400 may include determining criteria for each of the jobs (block 420). For example, job manager platform 220 (e.g., using computing resource 224, processor 320, communication interface 370, and/or the like) may determine criteria for each of the jobs. In some implementations, prior to posting each job to cluster computing framework 240, job manager platform 220 may determine execution criteria for each job, posting criteria for each job, validation criteria for each job, retry criteria for each job, and/or the like. In some implementations, the execution criteria may include criteria indicating how the jobs are to execute on cluster computing framework 240 (e.g., sequentially, in parallel, at particular times, and/or the like), criteria indicating a quantity of computing resources needed for a job, and/or the like. In some implementations, the posting criteria may include criteria indicating when the jobs are to be posted to (e.g., provided to) cluster computing framework 240 (e.g., posted first, second, third, and/or the like), times when the jobs are to be posted to cluster computing framework 240, and/or the like. In some implementations, the validation criteria may include criteria indicating whether results of executing the jobs are to be validated (e.g., checked for accuracy, checked for completion, and/or the like). In some implementations, the retry criteria may include criteria indicating whether jobs are to be resubmitted for execution by cluster computing framework 240 when cluster computing framework 240 fails to execute jobs.

In some implementations, job manager platform 220 may utilize one or more machine learning models to determine one or more of the criteria, such as the execution criteria and the posting criteria. In such implementations, the machine learning models may utilize the information associated with jobs to determine the one or more criteria. For example, based on the information associated with the jobs, the machine learning models may determine execution criteria for a particular job. In some implementations, the machine learning models may include an inductive learning model, a neural network model, a fuzzy logic model, and/or the like.

An inductive learning model may include a machine learning model that uses inductive learning (e.g., to determine one or more of the criteria). Inductive learning involves learning from observation and earlier knowledge by generalization of rules and conclusions. For example, inductive learning may allow for the identification of training data or earlier knowledge patterns and similarities which are then extracted as generalized rules that may be used in reasoning and problem-solving. Classification rules may be inferred by divide-and-conquer methods such as decision tree techniques, by separate-and conquer methods such as covering techniques, and/or the like.

A neural network model may include a machine learning model that uses an artificial neural network (e.g., to determine one or more of the criteria). An artificial neural network utilizes a collection of connected units or nodes called artificial neurons. Each connection between artificial neurons can transmit a signal from one artificial neuron to another artificial neuron. The artificial neuron that receives the signal can process the signal and then provide a signal to artificial neurons to which it is connected. In common artificial neural network implementations, the signal at a connection between artificial neurons is a real number, and the output of each artificial neuron is calculated by a non-linear function. Artificial neurons and connections typically have a weight that adjusts as learning proceeds. The weight may increase or decrease the strength of the signal at a connection. Additionally, an artificial neuron may have a threshold such that the artificial neuron only sends a signal if the aggregate signal satisfies the threshold. Typically, artificial neurons are organized in layers, and different layers may perform different kinds of transformations on their inputs.

A fuzzy logic model may include a machine learning model that applies fuzzy logic (e.g., to determine one or more of the criteria). Fuzzy logic is a form of many-valued logic in which truth values of variables may be any real number between zero and one. Fuzzy logic may be employed to represent a concept of partial truth, where a truth value may range between completely true and completely false, as opposed to Boolean logic, where the truth values of variables may only be the integer values zero or one, representing only absolute truth or absolute falseness. In some cases, a fuzzy logic model may include applying fuzzy logic to variations of existing machine learning models.

In this way, job manager platform 220 may determine the criteria for each of the jobs.

As further shown in FIG. 4, process 400 may include storing information associated with the jobs and the criteria in a repository (block 430). For example, job manager platform 220 (e.g., using computing resource 224, processor 320, communication interface 370, and/or the like) may store information associated with the jobs and the criteria in a repository. In some implementations, job manager platform 220 may store the information associated with the jobs and the criteria in a repository (e.g., that includes a data structure, such as a database, a table, a linked list, and/or the like) associated with job manager platform 220. In some implementations, the data structure may include a jobs field for storing job identifiers, a cluster names field for storing cluster names associated with clusters for executing the jobs, a delete on completion field for storing information indicating whether the jobs are to be deleted upon completion, a disaster recovery field for storing information indicating whether jobs are subject to a disaster recovery technique, a criteria field for storing the criteria for the jobs, and/or the like, associated with the information associated with the jobs and the criteria.

In some implementations, job manager platform 220 may securely store the information associated with the jobs and the criteria by encrypting the information associated with the jobs and the criteria using an encryption technology. For example, the information associated with the jobs and the criteria may be securely stored using symmetric-key (or single-key) encryption technology. Using symmetric-key encryption technology, a single key, which is shared by job manager platform 220 and the user, may be used to encrypt and decrypt the information associated with the jobs and the criteria. Example symmetric-key technologies may include the advanced encryption standard (AES), the data encryption standard (DES), the triple DES, serpent, twofish, blowfish, the international data encryption algorithm (IDEA), and/or the like.

In some implementations, the information associated with the jobs and the criteria may be securely stored using an asymmetric-key (or public-key-private-key) encryption technology. Using the asymmetric-key encryption technology, the information associated with the jobs and the criteria may be encrypted with a private key, and decrypted with a public key, to verify that the information associated with the jobs and the criteria was encrypted using the corresponding private key. Example asymmetric-key encryption technologies may include the digital signal algorithm (DSA), the Rivest-Shamir-Adleman (RSA), the Diffie-Hellman key exchange, key serialization, asymmetric utilities, and/or the like.

In some implementations, the information associated with the jobs and the criteria may be securely stored by applying a cryptographic hash function to the information associated with the jobs and the criteria. The cryptographic hash function may be used to verify the integrity of files and/or messages, verify passwords, and/or the like. Example cryptographic hash functions may include the secure hash algorithm 1 (SHA-1), the secure hash algorithm 2 (SHA-2), the secure hash algorithm 3 (SHA-3), the message digest 5 (MD5), and/or the like.

In this way, job manager platform 220 may store the information associated with the jobs and the criteria in the repository.

As further shown in FIG. 4, process 400 may include providing at least one job, of the jobs, to a cluster computing framework for execution (block 440). For example, job manager platform 220 (e.g., using computing resource 224, processor 320, communication interface 370, and/or the like) may provide at least one job, of the jobs, to cluster computing framework 240 for execution. In some implementations, once a job stack is created, job manager platform 220 may post a first job from the job stack to cluster computing framework 240. In some implementations, when posting the first job to cluster computing framework 240, job manager platform 220 may provide, to cluster computing framework 240, information associated with the first job, criteria for the first job, and a request to execute the first job in accordance with the information associated with the first job and the criteria for the first job.

In some implementations, cluster computing framework 240 may receive the information associated with the first job, the criteria for the first job, and the request to execute the first job, and may begin executing the first job. In such implementations, the master device of cluster computing framework 240 may provide the first job to the divider device of cluster computing framework 240. The divider device may divide the first job into multiple tasks, and may provide the tasks to the executor devices of cluster computing framework 240 for execution.

In some implementations, job manager platform 220 may monitor a status of the first job, and may log the status of the first job. In such implementations, job manager platform 220 may periodically query cluster computing framework 240 for the status of the first job, and may log the status received from cluster computing framework 240.

In this way, job manager platform 220 may provide the at least one job, of the jobs, to cluster computing framework 240 for execution.

As further shown in FIG. 4, process 400 may include determining modified criteria for the at least one job and providing the modified criteria to the cluster computing framework (block 450). For example, job manager platform 220 (e.g., using computing resource 224, processor 320, communication interface 370, and/or the like) may determine modified criteria for the at least one job, and may provide the modified criteria to cluster computing framework 240. In some implementations, job manager platform 220 may modify criteria for the first job after posting the first job to cluster computing framework 240. For example, assume that job manager platform 220 modifies the retry criteria of the first job to indicate that execution of the first job is to be retried upon failure. In some implementations, job manager platform 220 may modify the criteria for the first job based on an instruction to modify the criteria received from client device 210 (e.g., the user). In some implementations, job manager platform 220 may automatically modify the criteria for the first job based on new jobs received by job manager platform 220. For example, if a new job indicates that the new job is to be executed in parallel with the first job, job manager platform 220 may automatically modify the criteria for the first job to indicate that the first job is to be executed in parallel with the new job.

In some implementations, based on modifying the criteria for the first job, job manager platform 220 may provide, to cluster computing framework 240, the modified criteria and a request to retry execution of the first job. In some implementations, cluster computing framework 240 may receive the modified criteria and the request to retry the execution of the first job, and may cease execution of the first job. In such implementations, cluster computing framework 240 may then retry executing the first job. For example, the master device of cluster computing framework 240 may once again provide the first job to the divider device of cluster computing framework 240. The divider device may divide the first job into multiple tasks, and may provide the tasks to the executor devices of cluster computing framework 240 for execution.

In this way, job manager platform 220 may determine the modified criteria for the at least one job, and may provide the modified criteria to cluster computing framework 240.

As further shown in FIG. 4, process 400 may include receiving, from the cluster computing framework, information indicating that execution of the at least one job is completed (block 460). For example, job manager platform 220 may receive, from cluster computing framework 240, information indicating that execution of the at least one job is completed. In some implementations, the information indicating that execution of the first job is complete may include a notification that execution of the first job is complete, information indicating results of executing the first job, information indicating errors encountered during execution of the first job, and/or the like.

In some implementations, cluster computing framework 240 may automatically provide, to job manager platform 220, the results of executing the first job when the first job is completely executed. In some implementations, cluster computing framework 240 may automatically provide, to job manager platform 220, task execution results generated by the executor devices before the first job is completely executed. In some implementations, timing associated with when cluster computing framework 240 provides the results of executing the first job to job manager platform 220 may depend on criteria associated with the first job.

In this way, job manager platform 220 may receive, from cluster computing framework 240, the information indicating that execution of the at least one job is completed.

As further shown in FIG. 4, process 400 may include validating a success of completion of the execution of the at least one job (block 470). For example, job manager platform 220 (e.g., using computing resource 224, processor 320, communication interface 370, and/or the like) may validate a success of completion of the execution of the at least one job. In some implementations, when job manager platform 220 receives the information indicating that execution of the first job is complete, job manager platform 220 may validate a success of the completion of the first job.

In some implementations, job manager platform 220 may validate the success of the completion of the first job by analyzing the results of executing the first job, and determining whether the results are correct. In some implementations, job manager platform 220 may perform analytics on the results of executing the first job. In some implementations, the analytics may include determining an elapsed time for executing the first job. In such implementations, if the elapsed time is longer than expected, the first job may cost more to execute and job manager platform 220 may determine why the elapsed time is longer than expected.

In some implementations, when job manager platform 220 posts the first job to cluster computing framework 240, job manager platform 220 may also implement listeners (e.g., software code that collects information) in the cluster computing framework 240 to collect metrics information associated with the first job, such as metrics associated with execution time, CPU usage (e.g., by executor devices), and/or the like during execution of the first job and/or the tasks of the first job. In such implementations, job manager platform 220 may utilize performance metrics from multiple jobs, and may correlate a behavior of the performance metrics, such as elapsed time, CPU usage, scheduler delay, shuffle input/output (I/O) time, I/O time, and/or the like. The performance metrics may enable job manager platform 220 to compare job execution performance across different jobs and different clusters. In some implementations, job manager platform 220 may utilize the job execution performance across different jobs and different clusters as input to the machine learning models in order to improve generation of future criteria, as input to job manager platform 220 in order to improve processing of future jobs, and/or the like.

In this way, job manager platform 220 may validate the success of completion of the execution of the at least one job.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein may provide a job manager platform that remotely manages execution of jobs in a cluster computing framework. For example, the job manager platform may receive a request to execute jobs, and may determine criteria for each of the jobs. The job manager platform may store information associated with the jobs in a repository, and may provide a job, of the jobs, to a cluster computing framework for execution. The job manager platform may determine modified criteria for the job, and may provide the modified criteria to the cluster computing framework. The job manager platform may receive, from the cluster computing framework, information indicating that execution of the job is completed, and may validate a success of completion of the execution of the job.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a request for execution of a plurality of jobs;
   determining, by the device and based on receiving the request, execution criteria, for a particular job of the plurality of jobs, and retry criteria for the particular job,
      wherein the execution criteria indicates that the particular job is to be executed in parallel with a second job of the plurality of jobs;
   providing, by the device, to a first master device of a first cluster computing framework different from the device, a request for execution of the particular job according to the execution criteria,
      wherein the first cluster computing framework comprises the first master device and one or more first executor devices to execute the particular job according to the execution criteria;
   receiving, by the device, from the first master device, and based on providing the request, information associated with the one or more first executor devices failing to execute at least one of the particular job or the second job; and
   sending, by the device, to the first master device, and based on the retry criteria and the information associated with the one or more first executor devices failing to execute the at least one of the particular job or the second job an instruction to re-route the particular job, and either the execution criteria or modified execution criteria, to a second master device, of a second cluster computing framework different from the device, for execution of the particular job according to the execution criteria or the modified execution criteria,
      wherein the second cluster computing framework comprises the second master device and one or more second executor devices to execute of the particular job according to the execution criteria or the modified execution criteria.

2. The method of claim 1, further comprising:
   causing a job stack to be created based on the plurality of jobs, and
      wherein the request is sent based on causing the job stack to be created.

3. The method of claim 1, further comprising:
   receiving, based on sending the instruction, information indicating that a first execution, of the particular job, and a second execution, of the second job, are complete; and
   analyzing, based on receiving the information indicating that the first execution, of the particular job, and the second execution, of the second job, are complete, results of the first execution and the second execution.

4. The method of claim 3, wherein analyzing the results of the first execution and the second execution comprises:
   determining a first elapsed time, for the first execution of the particular job, and a second elapsed time for the second execution of the second job; and
   comparing, based on determining the first elapsed time and the second elapsed time, the first execution, of the particular job, to the second execution of the second job.

5. The method of claim 3, further comprising:
   causing a job stack to be deleted based on analyzing the results of the first execution and the second execution.

6. The method of claim 1, further comprising:
   collecting performance metrics associated with the plurality of jobs; and
   comparing, based on collecting the performance metrics, execution performance of the plurality of jobs.

7. The method of claim 1, wherein the instruction is to re-route the particular job and the modified execution criteria to the second master device of the second cluster computing framework.

8. A device, comprising:
   one or more memories; and
   one or more processors coupled to the one or more memories, configured to:
   receive a request for execution of a plurality of jobs;
   determine, based on receiving the request, execution criteria, for a particular job of the plurality of jobs, and retry criteria for the particular job,
      wherein the execution criteria indicates that the particular job is to be executed in parallel with a second job of the plurality of jobs;
   provide, to a first master device of a first cluster computing framework different from the device, a request for execution of the particular job according to the execution criteria,
      wherein the first cluster computing framework comprises the first master device and one or more first executor devices to execute the particular job according to the execution criteria;
   receive, from the first master device and based on providing the request, information associated with the one or more first executor devices failing to execute at least one of the particular job or the second job; and send, to the first master device and based on the retry criteria and the information associated with the one or more first executor devices failing to execute the at least one of the particular job or the second job an instruction to re-route the particular job, and either the execution criteria or modified execution criteria, to a second master device, of a second cluster computing framework different from the device, for execution of the particular job according to the execution criteria or the modified execution criteria,
wherein the second cluster computing framework comprises the second master device and one or more second executor devices to execute the particular job according to the execution criteria or the modified execution criteria.

9. The device of claim 8, wherein the one or more processors are further configured to:
cause a job stack to be created based on the plurality of jobs, and
wherein the request is sent based on causing the job stack to be created.

10. The device of claim 8, wherein the one or more processors are further configured to:
receive, based on sending the instruction, information indicating that a first execution, of the particular job, and a second execution, of the second job, are complete; and
analyze, based on receiving the information indicating that the first execution, of the particular job, and the second execution, of the second job, are complete, results of the first execution and the second execution.

11. The device of claim 10, wherein the one or more processors, to analyze the results of the first execution and the second execution, are configured to:
determine a first elapsed time, for the first execution of the particular job, and a second elapsed time for the second execution of the second job; and
compare, based on determining the first elapsed time and the second elapsed time, the first execution, of the particular job, to the second execution of the second job.

12. The device of claim 10, wherein the one or more processors are further configured to:
cause a job stack to be deleted based on analyzing the results of the first execution and the second execution.

13. The device of claim 8, wherein the one or more processors are further configured to:
collect performance metrics associated with the plurality of jobs; and
compare, based on collecting the performance metrics, execution performance of the plurality of jobs.

14. The device of claim 8, wherein the instruction is to re-route the particular job and the modified execution criteria to the second master device of the second cluster computing framework.

15. A non-transitory computer-readable medium storing instructions, the instructions comprising:
one or more instructions that, when executed by one or more processors of a device, cause the one or more processors to:
receive a request for execution of a plurality of jobs;
determine, based on receiving the request, execution criteria, for a particular job of the plurality of jobs, and retry criteria for the particular job,
wherein the execution criteria indicates that the particular job is to be executed in parallel with a second job of the plurality of jobs;
provide, to a first master device of a first cluster computing framework different from the device, a request for execution of the particular job according to the execution criteria;
wherein the first cluster computing framework comprises the first master device and one or more first executor devices to execute the particular job according to the execution criteria;
receive, from the first master device and based on providing the request, information associated with the one or more first executor devices failing to execute at least one of the particular job or the second job; and
send, to the first master device and based on the retry criteria and the information associated with the one or more first executor devices failing to execute the at least one of the particular job or the second job, an instruction to re-route the particular job, and either the execution criteria or modified execution criteria, to a second master device, of a second cluster computing framework different from the first cluster computing framework, for execution of the particular job according to the execution criteria or the modified execution criteria,
wherein the second cluster computing framework comprises the second master device and one or more second executor devices to execute the particular job according to the execution criteria or the modified execution criteria.

16. The non-transitory computer-readable medium of claim 15, wherein the one or more instructions, when executed by the one or more processors, further cause the one or more processors to:
cause a job stack to be created based on the plurality of jobs;
wherein the request is sent based on causing the job stack to be created.

17. The non-transitory computer-readable medium of claim 15, wherein the one or more instructions, when executed by the one or more processors, cause the one or more processors to:
receive, based on sending the instruction, information indicating that a first execution, of the particular job, and a second execution, of the second job, are complete; and
analyze, based on receiving the information indicating that the first execution, of the particular job, and the second execution, of the second job, are complete, results of the first execution and the second execution.

18. The non-transitory computer-readable medium of claim 17, wherein the one or more instructions, that cause the one or more processors to analyze the results of the first execution and the second execution, cause the one or more processors to:
determine a first elapsed time, for the first execution of the particular job, and a second elapsed time for the second execution of the second job; and
compare, based on determining the first elapsed time and the second elapsed time, the first execution, of the particular job, to the second execution of the second job.

19. The non-transitory computer-readable medium of claim 17, wherein the one or more instructions, when executed by the one or more processors, further cause the one or more processors to:
cause a job stack to be deleted based on analyzing the results of the first execution and the second execution.

20. The non-transitory computer-readable medium of claim 17, wherein the instruction is to re-route the particular job and the modified execution criteria to the second master device of the second cluster computing framework.

\* \* \* \* \*